(12) United States Patent
Skillermark et al.

(10) Patent No.: US 6,993,339 B2
(45) Date of Patent: Jan. 31, 2006

(54) RESOURCE ALLOCATION IN CELLULAR SYSTEMS

(75) Inventors: Per Skillermark, Stockholm (SE); Paolo Guidotti, Casalecchio (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 490 days.

(21) Appl. No.: 10/133,624

(22) Filed: Apr. 29, 2002

(65) Prior Publication Data

US 2002/0164989 A1     Nov. 7, 2002

(30) Foreign Application Priority Data

May 4, 2001    (SE)    .................................. 0101564

(51) Int. Cl.
*H04Q 7/20*    (2006.01)

(52) U.S. Cl. ...................... 455/447; 455/446; 455/448; 455/450; 455/451; 455/524; 455/525; 455/561; 370/328; 370/329; 370/330; 370/341; 370/431; 370/468

(58) Field of Classification Search ........ 455/446–448, 455/450–453, 455, 507, 516–517, 524–525, 455/561, 509; 370/328–330, 336, 337, 342, 370/344, 347, 341, 431, 468
See application file for complete search history.

(56) References Cited

U.S. PATENT DOCUMENTS

| 5,594,720 | A | 1/1997 | Papadopoulos et al. |
| 6,137,787 | A | 10/2000 | Chawla et al. |
| 6,188,903 | B1 * | 2/2001 | Gardner et al. ............. 455/447 |
| 6,497,599 | B1 * | 12/2002 | Johnson et al. ............. 455/447 |
| 6,654,612 | B1 * | 11/2003 | Avidor et al. ............... 455/450 |
| 6,707,798 | B1 * | 3/2004 | Klein et al. ................. 370/280 |
| 2002/0145988 | A1 * | 10/2002 | Dahlman et al. ........... 370/335 |
| 2004/0203806 | A1 * | 10/2004 | Craig et al. ................. 455/450 |

FOREIGN PATENT DOCUMENTS

WO    97/49258 A1    12/1997

* cited by examiner

*Primary Examiner*—Temica M. Beamer
*Assistant Examiner*—Anthony S. Addy
(74) *Attorney, Agent, or Firm*—Nixon & Vanderhye, P.C.

(57) ABSTRACT

In the present invention, in a cellular communication system using frames (20) of communication resources in time and/or frequency domain, the communication resources (22) are divided into at least two regions (24, 26, 28). A first region (24) has a higher reuse in time and/or frequency domain than a second region (26, 28). The first region is a hybrid region (24), in which the communication resources individually are allocable for either uplink or downlink communication on a cell-to-cell basis. The second region is preferably a dedicated region (26), in which all communication resources have either uplink or downlink allocation. A third region (28) is preferably also present, in which all communication resources are allocated in the opposite direction to the second region (26). In preferred embodiments, the actual allocation of the hybrid region (24) is based on the traffic situation in each individual cell.

27 Claims, 6 Drawing Sheets

RESOURCE ALLOCATION IN CELLULAR SYSTEMS

TECHNICAL FIELD

The present invention is generally related to methods and devices for use in cellular communication systems, and in particular to methods and devices for communication resource allocation within such systems.

BACKGROUND

In upcoming third generation mobile telephony systems, a large part of the load in the networks is expected to be data traffic, caused by e.g. file transfer, web-browsing etc. Furthermore, a large part of the traffic is expected to appear in the downlink direction, and thus, a certain degree of traffic asymmetry must be managed in the networks. The asymmetry can be different in different regions and may also vary with time.

Among the third generation mobile telephony systems, it is claimed that UTRA-TDD efficiently supports asymmetric traffic. However, the support of different degrees of asymmetric traffic in different cells will introduce more interference in the system. Thus, in order to achieve an acceptable trade-off between the requirements set by the traffic demands and the interference, some flexibility must be included in the radio resource management In a near future, the data traffic in the mobile networks is expected to increase significantly. The load in the networks, according to the argumentation above, is as described above likely to be asymmetric and the degree of asymmetry will vary with time and position within the cellular system.

Thus, a cellular communication system that can allocate a different amount of resources for uplink and downlink transmission would be appreciated, especially if each cell independently can allocate resources for uplink and downlink transmissions according to the traffic demand in each individual cell.

In a system with fixed uplink and downlink allocations, there is no way to adapt the communication resource allocation to the cell-specific traffic demand. On the other hand, in a system where uplink and downlink resources can be exchanged freely, it is in principle possible to adapt the resource allocation to the traffic demand in each cell. An example of such a system is UTRA-TDD, where the communication resource (in this case time slot) allocation can be performed on a cell basis.

For a uniform traffic situation, i.e. a situation where the uplink/downlink asymmetry is the same for essentially the entire system, a resource allocation common to all cells, i.e. global resource allocation, performs well. However, for non-uniform traffic distributions, a global resource allocation performs poorly since it often results in blocking. On the other hand, if the resource allocation is performed totally independently by each cell, and thus adapts to the demands in each cell, the blocking would be minimized.

However, this cell-to-cell independent resource allocation could instead go cause the drawback of increased and unpredictable interference in terms of base-to-base and mobile-to-mobile interference.

In the International patent application WO 00/011888, a system is disclosed, in which the downlink and the uplink fields in each cell are divided into different regions, based on the expected interference in each region. One region is dedicated to uplink traffic, one is dedicated to downlink traffic and one hybrid region has an allocation pattern, which can be changed from time to time. The users are allocated to the different regions according to the quality of the connection. Users with good quality are allocated to a region with relatively high interference and vice versa. Allocating bad links to the dedicated regions while good links are allocated to the hybrid region reduces possible interference.

A problem with the system disclosed in WO 00/01188 is that continuous measurements have to be performed every time when allocation of communication resources to different users takes place. Such an evaluation of the link quality requires both time and computational resources. Since users may move within the cell, the conditions for the links may change with time and frequent reallocations are performed. A high flexibility is achieved but to the price of a large measurement effort and high required computational power.

In U.S. Pat. No. 5,594,720, a cellular communication system is disclosed, in which a frame of slots is divided into two or three regions. When using three regions, two regions are dedicated to uplink and downlink traffic, respectively, and the third region is a hybrid region, here the allocation may vary. The disclosed system is based on directional antennas, and the geometrical pattern of these antennas is used to minimize any co-channel interference.

A problem with the system disclosed in U.S. Pat. No. 5,594,720 is that in order to change the allocation pattern in the hybrid region, information about the cell structures is required. A change of allocation in the hybrid region thus has to be performed in cooperation with neighboring cells, which means that such control has to be performed at a high system level. This results in considerable reporting and signaling activity. The possible flexibility will be reduced significantly in such a system. Furthermore, this solution is only operable in systems using directional antennas. No general solutions for omni-directional antennas are indicated.

SUMMARY

An object of the present invention is thus to provide methods and devices for allocation of communication resources in a cellular communication system capable of simultaneously providing a high degree of allocation flexibility and reducing possible inter-cell interference. A further object of the present invention is to provide for dynamic allocation of downlink and uplink on a cell-to-cell basis with a reduced risk for of inter-cell interference. Yet another further object is to provide such methods and devices, which are independent of the specific type of antennas used. Yet another object of the present invention is to reduce the need for measurements, reporting and inter-cell signaling, when performing allocation procedures. It is also a further object of the present invention to provide methods and devices, which give a total transmission capacity comparable to prior art systems.

The above objects are achieved by methods, devices and systems according to the enclosed patent claims. In general words, in a cellular communication system using frames of communication resources in time and/or frequency domain, the communication resources within each of said frames are divided into at least two regions. A first region has a higher reuse in time and/or frequency domain than a second region. Preferably, the first region is a hybrid region, in which the communication resources individually are allocable for either uplink or downlink communication on a cell-to-cell basis. The second region is preferably a dedicated region, in which all communication resources are fixed allocated to either uplink or downlink communication. In a further preferred embodiment, there is also a third region, in which all communication resources are fixed allocated in the opposite direction to the second region.

In preferred embodiments, the actual allocation of the hybrid region is based on the traffic situation in each individual cell. The reuse pattern of the hybrid region is preferably exchangeable on a system-wide basis. The reuse pattern is then preferably selected from a predetermined set of patterns adapted to inter-cell interference levels. Preferably, also the borders between the regions are adjustable on a system-wide basis. Given a reuse pattern for the different regions, the border positions are adapted based on e.g. the present and/or expected traffic situation.

BRIEF DESCRIPTION OF THE DRAWINGS

The invention, together with further objects and advantages thereof, may best be understood by making reference to the following description taken together with the accompanying drawings, in which:

FIG. 5a is an illustration of the spatial distribution of the reuse in a hybrid region of the frame of FIG. 4a;

DETAILED DESCRIPTION

"Communication resource" is used herein to denote any reservable communication unit used for communication, such as time slot, frequency, code, or any combination of these. A time slot is thus a communication resource in the time domain and a frequency band is a communication resource in the frequency domain. Further, a resource can normally be reused several times throughout a system, which makes the resource usage strongly connected to the geographic location. Examples of systems using these concepts are DECT (TDD FD-TDMA), UTRA-FDD (FDD CDMA), UTRA-TDD (TDD TD-CDMA) and (GSM (FDD FD-TDMA).

Figure 1A:
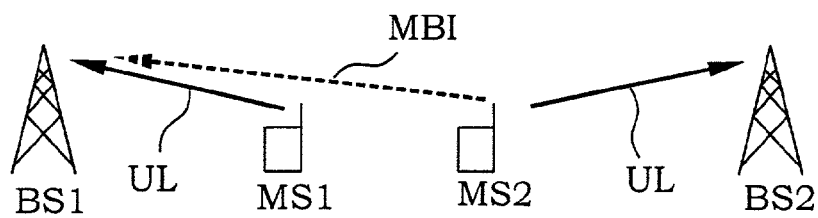
FIG. 1a is a schematic drawing illustrating interference in uplink traffic in a system.

A cellular communication system comprises typically a number of cells, covering a certain geographical area. Within each cell, a base station conducts communication operations with a number of mobile stations. In order to cover an area completely, a certain overlap of the cell areas has to exist, and even where the signal strength from a base station is too low for a reliable communication, disturbances may arise. FIG. 1a illustrates two base stations BS1 and BS2. Two mobile stations MS1 and MS2 are present in the area in the vicinity of the base stations. At the moment BS1 handles the communication to MS1 and MS2 is connected through BS2. Certain communication resources, such as e.g. time slots, are allocated for uplink traffic and certain other resources are allocated for downlink traffic. This allocation is in a traditional cellular system constant and equal for each cell. As illustrated in FIG. 1a, MS1 communicates in a resource allocated for uplink communication with the base station BS1 and MS2 in a similar way with BS2. The signals sent from MS2 may also be detected as an interference signal MBI by BS1. The MBI interference is a so-called mobile-to-base interference.

Figure 1B:
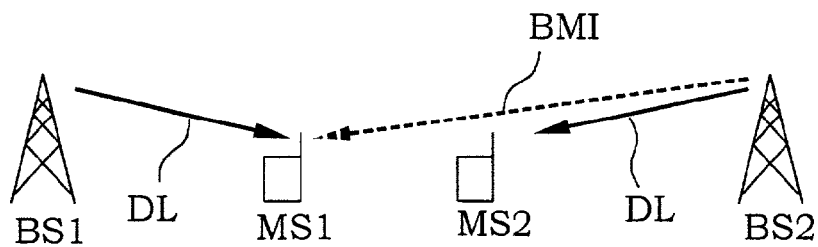
FIG. 1b is a schematic drawing illustrating interference in downlink traffic in a system.

FIG. 1b illustrates a similar case, where downlink traffic is sent in a certain allocated resource from BS1 and BS2 to MS1 and MS2, respectively. Interference BMI is also here possible, since the signals from e.g. BS2 may be detected also by MS1, a base-to-mobile interference.

Such base-to-mobile and mobile-to-base interferences are well known and treated by the present systems in well-known manners.

Figure 1C:
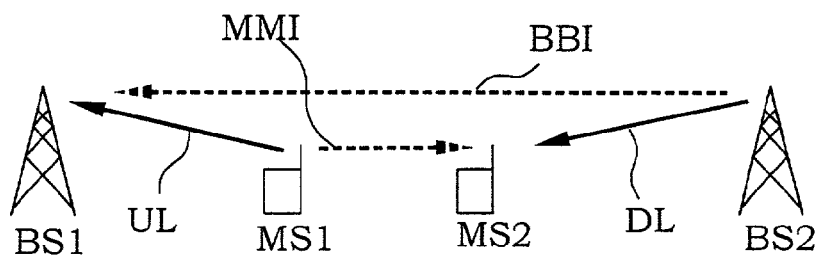
FIG. 1c illustrates a situation, where two base stations within interference distance of each other have different allocations of its resources for uplink and downlink communication, respectively.

FIG. 1c illustrates a situation, where two base stations within interference distance of each other have different allocations of resources for uplink and downlink communication, espectively. New interference situations will thereby be present. In the illustrated case, MS1 communicates with BS1 in a certain resource, which is allocated for uplink communication within the cell of BS1. However, the same resource is allocated for downlink communication in the cell of BS2, whereby BS2 may send signals to MS2 at the very same resource. Two new interference types are here present. A base-to-base interference BBI occurs when e.g. BS1 receives signals from BS2 and a mobile-to-mobile interference MMI occurs when e.g. MS2 picks up signals from MS1. These interferences only occur when the resource allocation is different in cells within interference distance of each other.

A base-to-base interference BBI is normally static, in that sense that the signal strength from the base station BS2 typically is constant or at least within a certain dynamical power range and the transmission conditions to BSI are normally rather constant, since the base stations are geographically fixed with respect to each other. Interferences may be measured and/or pre-calculated. However, since the transmission strength of a base station typically is much larger than from a mobile station and that line of sight often is present between base stations, the BBI interference signal may even dominate over the actual uplink signal. Compensations for such interferences may be possible to perform due to the known behavior.

A mobile-to-mobile interference MMI is more rare, since the transmission strength of a mobile station is typically much less than for a base station. In order for the interference to be noticeable, the mobile stations have to be situated geographically close to each other. The MMI have thus normally less impact on the total system performance in that sense that it only occurs with a small probability. However, since they depend on the relative locations of the mobile stations, MMI interferences are not constant in time but rather stochastic, which means that when occurring, they are extremely difficult to compensate for and therefore quite severe.

Figure 2:
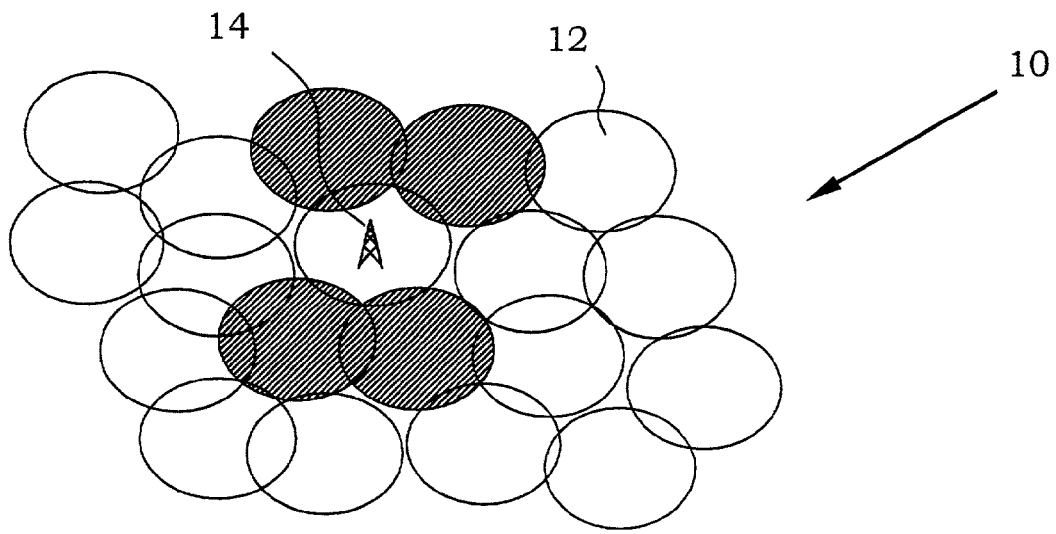
FIG. 2 is a schematic drawing illustrating interfering cells in a cellular system.

FIG. 2 is a schematic drawing of a cellular system 10. A number of cells 12 are arranged to cover (most of) a certain geographical area. (Only one item of each is numbered in order to increase the readability of the figure.) Each cell 12 has a certain coverage, depending of transmission strengths and/or transmission conditions, schematically indicated by the border of the ellipse. Each cell 12 has a base station 14 (only one is illustrated). Each of the base stations is within interference distance with a number of other base stations. For the cell with the illustrated base station 14, there are four interfering cells, marked with a hatching. When discussing "surrounding" interfering cells, the word should thus not be considered in a purely geographical sense, but more as a combination of transmission conditions and spatial relationships. The important issue is if the cells may interfere with each other.

Now assume that all cells in the system have about the same traffic situation, in particular the same ratio between uplink and downlink traffic. Certain communication resources, in e.g. a frame, can then be dedicated to uplink traffic and others can be dedicated to downlink traffic. This division can then be similar throughout the entire system. In such a case, there will only be risks for base-to-mobile and mobile-to-base interference, which can be handled in conventional manners.

However, assume instead that cells in one part of the system have a large downlink traffic demand, but cells in another part of the system have a large uplink traffic demand. If a constant system-wide division between uplink and downlink communication resources is used, there will be a considerable blocking of traffic somewhere in the system. Instead, if one allows a local cell allocation of the communication resources, there will appear a large risk for the more difficult interferences to handle, the mobile-to-mobile interference and the base-to-base interference.

Communication resources within each frame used by the communication system are divided into a number of regions, i.e., at least two regions. Communication resources for which a high risk r interference is present are placed in a first region. Other communication resources for which a lower risk for interference is present are placed in at least a second region. The region with the high interference risk communication resources is then given a higher reuse than the second region, in order reduce the probability for interference. The higher reuse is provided in the time, frequency, or code domain, or a combination thereof e.g. in time slots and frequency bands or in spreading codes and time slots.

Below, an exemplifying embodiment is described, taken from an UTRA-TDD system. However, the invention is not limited to such a system, but can also be applied to other cellular communication systems using frames of communication resources in time or frequency domain or a combination thereof. The embodiment is particularly suitable for handling interferences appearing at adaptive uplink/downlink allocation, but may in its wider definition also be used in other applications.

Figure 3:
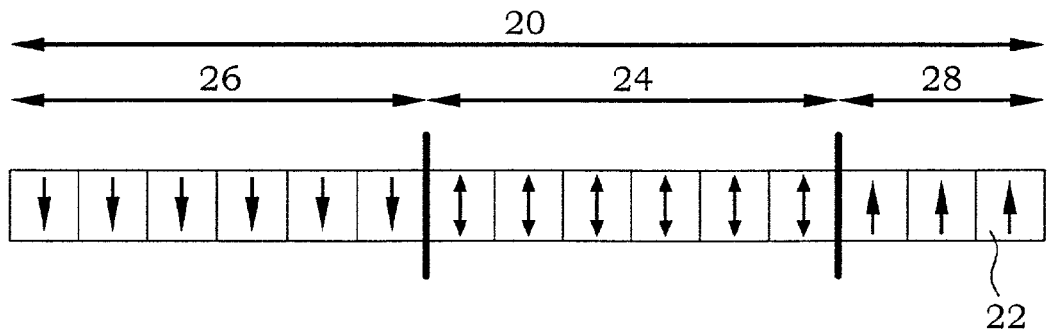
FIG. 3 is a schematic illustration of a frame of communication resources according to the present invention.

In FIG. 3, a frame 20 of an UTRA-TDD system is illustrated. In this case, the frame 20 comprises 15 time slots 22. The frame is divided into three regions, a dedicated downlink region 26, a dedicated uplink region 28 and a hybrid region 24. In the dedicated downlink region 26, all time slots 22 are allocated only for downlink communication, i.e. communication from the base station to the mobile unit. This allocation is made system-wide, i.e. all cells in the system have the same allocation for time slots in the dedicated region 26. In the dedicated uplink region 28, all time slots 22 are allocated only for uplink communication, i.e. communication from the mobile unit to the base station. Also this allocation is made system-wide. Finally, in the hybrid region 24, the time slots 22 are individually allocated in either direction, i.e. for either uplink or downlink traffic, independent of the other time slots 22 in the hybrid region 24. The allocation of the hybrid region 24 is contrary to the dedicated ones made locally on a cell-to-cell basis, i.e. each cell may have its own allocation pattern.

According to the present embodiment, the hybrid region 24 has a higher reuse than the two dedicated regions 26, 28. In the dedicated regions, the inter-cell interference is limited to mobile-to-base and base-to-mobile interference, and therefore, it is possible to apply a relatively low reuse (e.g. reuse=1) of the resources. In the hybrid region, the inter-cell interference might also include mobile-to-mobile and base-to-base interference. This interference is normally severe and degrades system performance. However, inter-cell interference can be reduced by increasing the reuse. Thus in the hybrid region, reuse is applied and the reuse allocated resources can, be used in either the uplink or in the downlink direction by the cell in a flexible way. In the hybrid region, each cell adapts the to cell in the reuse allocated resources to instant and local traffic demands.

Figure 4A:
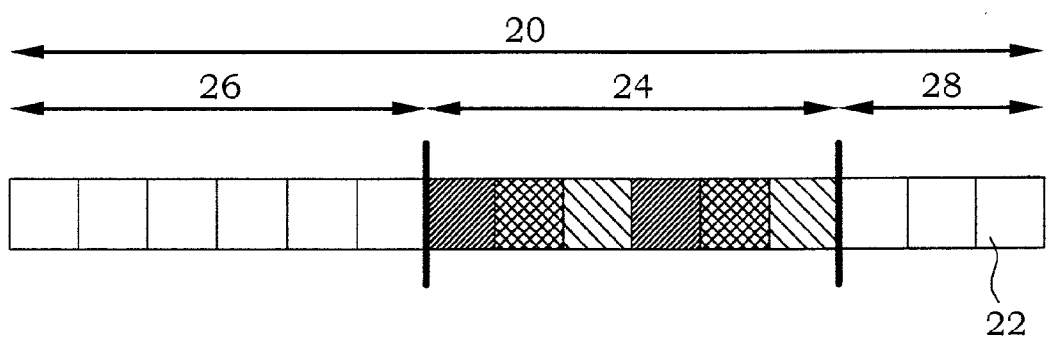
FIG. 4a is a schematic illustration of the reuse of different regions of the frame of FIG. 3.
Figure 5A:
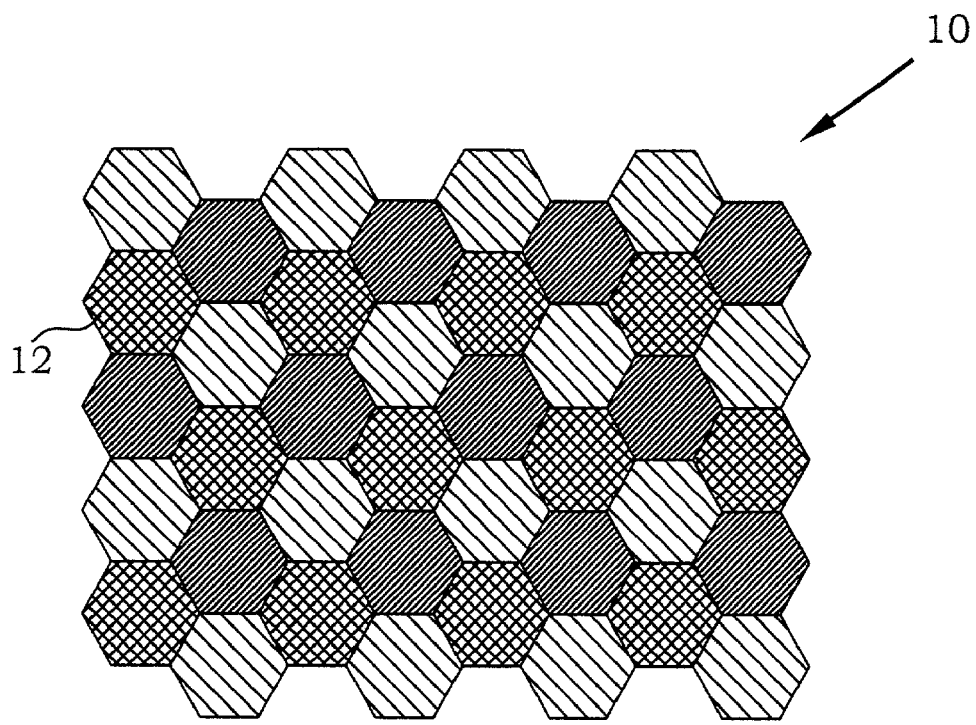

FIG. 4a illustrates a case, where the dedicated regions 26, 28 have a reuse of 1 and the hybrid region 24 a reuse of 3. The reuse pattern is in this case design such that the first and fourth time slot in the hybrid region 24 are used by one third of the cells, the second and fifth time slot are used by another third of the cells and finally the third and sixth time slots are used by the remaining third of the cells. FIG. 5a illustrates this situation in a cell block dimension. The different cells 12 are illustrated as hexagons and the hatching in each cell corresponds to the used time slots within the hybrid region 24. As anyone can see, each cell is surrounded only by cells using different time slots of the hybrid region. This means that any mobile-to-mobile interference has to appear between cells that are separated a distance from each other. The probability for interference will therefore be reduced significantly.

Figure 4B:
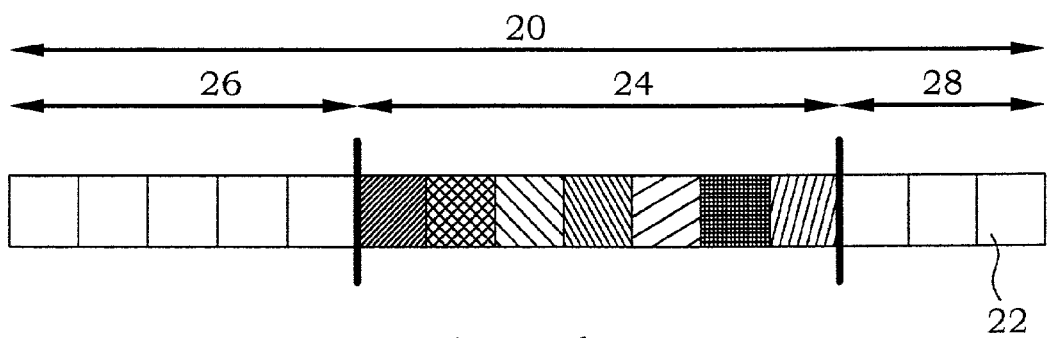
FIG. 4b is a schematic illustration of the reuse of different regions in another frame.
Figure 5B:
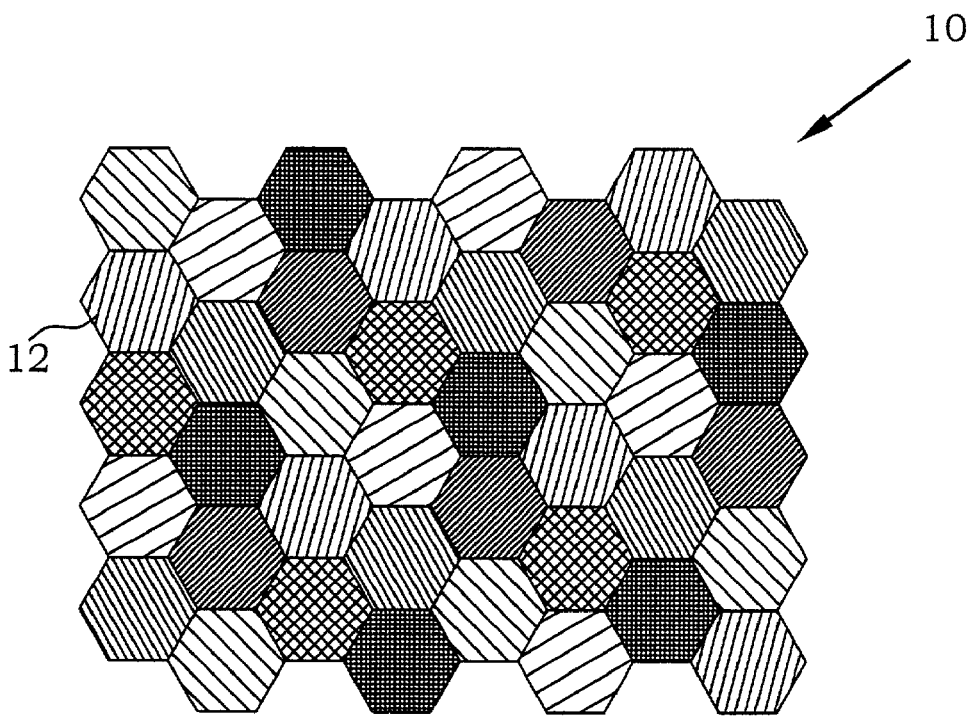
FIG. 5b is an illustration of the spatial distribution of the reuse in a hybrid region of the frame of FIG. 4b.

FIG. 4b illustrates another setup of the frame. In this case, the hybrid region 24 comprises 7 time slots and has a reuse pattern corresponding to a reuse of 7. Each cell will therefore only use one time slot within the hybrid region. FIG. 5b illustrates the corresponding cell pattern. Here, one notices that the distance between cells using the same time slot within the hybrid region is even larger, which decreases the interference probability even more.

At a first glance, it might appear that the total available communication resources are significantly decreased due to the higher reuse in time and/or frequency domain in the hybrid region. However, taking e.g. the allocation of codes in each time slot into account, the decrease in total communication capacity is typically low, if any at all.

Figure 6A:
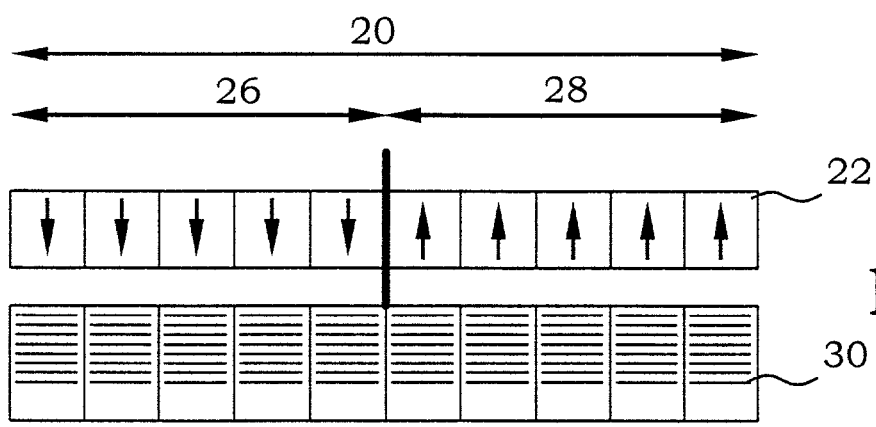
FIG. 6a is an illustration of a frame with system-wide dedicated allocation.

In FIG. 6a, a frame of a system having a fixed uplink/downlink allocation throughout the entire system is shown. In this example, the frame comprises 10 time slots, 5 dedicated to each direction. In each time slots, there are possibilities to use 16 codes, thus giving a total theoretical capacity of 80 channels in each communication direction. However, there exists certain interference between the different codes, depending on e.g. the reuse in time or frequency domain. In a typical case, 8 of the codes 30 are possible to use in each time slot. The actual capacity in each direction is therefore 40 channels.

Figure 6B:
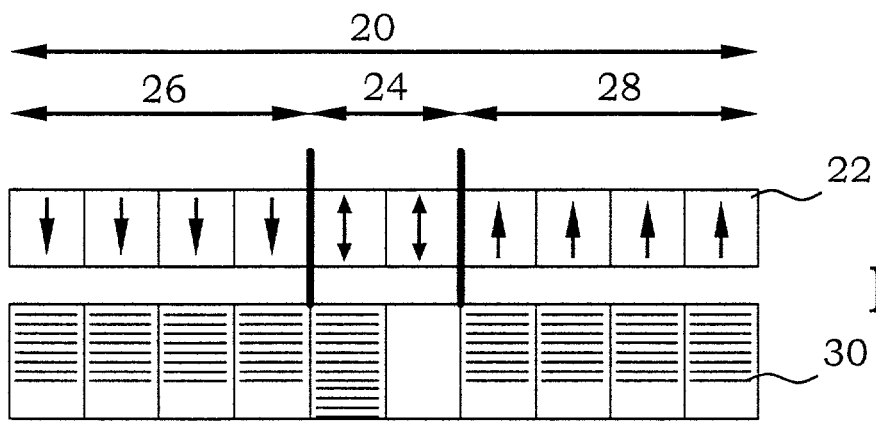
FIG. 6b is an illustration of a frame according to an embodiment of the present invention.

In FIG. 6b, a frame is illustrated wherein each dedicated region 26, 28 comprises four time slots each and the hybrid region 24 comprises two time slots. With a reuse of 2, each cell can use one of the time slots for communication in either direction. Each of the dedicated time slots can make use of 8 codes 30 (in analogy with above). The single permitted time slot in the hybrid region 24 is, however, depending on the higher reuse, not equally limited in the use of codes. In a typical case, 12 codes might be usable in this hybrid time slot. The actual capacity in this example will therefore be 32 channels in each direction and another 12 channels, which can be allocable in either of the direction. The total decrease in available transmission capacity is in this case reduced by 5%.

Furthermore, in certain traffic situations, the useful transmission capacity may even increase. Again consider the FIGS. 6a and 6b. Now, assume that in a first cell, there is a request of 44 channels of downlink traffic and 27 channels of uplink traffic. In a neighboring cell, the situation is the opposite, 44 channels of requested uplink traffic and 27 channels of requested downlink traffic. The frame in FIG. 6a will not be able to handle such a situation. Even if the border between the dedicated regions is moved system-wide in any direction, there will be a minimum of 8 channels altogether, which are blocked. However, with the frame of FIG. 6b, the situation is different. In the first cell, the time slot of the hybrid region is allocated in the downlink direction. There are then 44 (8×4+12) channels available for downlink traffic and 32 channels available for uplink traffic, which is sufficient to meet the requested capacity. In the neighboring cell, the allocation of the time slot of the hybrid cell is in the opposite direction, i.e. for uplink communication. There will then be 44 channels available for uplink communication and 32 available for downlink communication. This means, that even if the absolute maximum number of available communication channels may be somewhat lower in a system according to the present invention, the flexibility of the system makes it possible to adjust for traffic situations in such a way that the useful number of communication channels in reality is increased.

From the above examples, one realizes that the benefits of the invention as well as the optimized configuration concerning region borders and reuse patterns will depend strongly on the actual system and the actual traffic situation. The propagation conditions between the cells are of importance. Normally, these propagation conditions are almost constant and a radio resource management may take this into account. However, in certain cases, a monitoring of the actual propagation conditions may be of interest. The traffic situation changes more rapidly and is probably of more interest in planning the frame division. It is therefore preferred if the position of the borders between the different regions is possible to adapt. Such adaptations will, however, typically not be performed frequently, but will only be used for slowly changing conditions. It is believed that adaptations in region borders will not take place more often than a few times a day and in most systems even less frequent than that. If a system has traffic situations, which are rather constant, adaptations may be performed on a time scale of months or even years. The adaptations of the regions, if any, have to be performed system-wide, since all cells in the system has to follow the same division into the different regions. This also implies that before any adaptation can take place, the communication resources which are influenced by this change have to be emptied throughout the entire system. Adaptations are thus most likely to occur during low-traffic periods.

A corresponding argumentation is valid also for the actual reuse pattern of the hybrid region. The choice of reuse pattern will be dependent on basically the same factors as for the region borders. In a typical case, there will be a set of pre-planned reuse patterns available, and if the inter-cell interference levels are changed, e.g. due to radically changed propagation conditions, a selection is made between these available pre-planned reuse patterns. Note that also the change of the reuse pattern has to be performed system-wide, which thus involves all cells of the system. It is believed that the change of the reuse (e.g. 1, 2 or 3) for the regions may be performed on a time scale of months or even years.

Figure 7A:
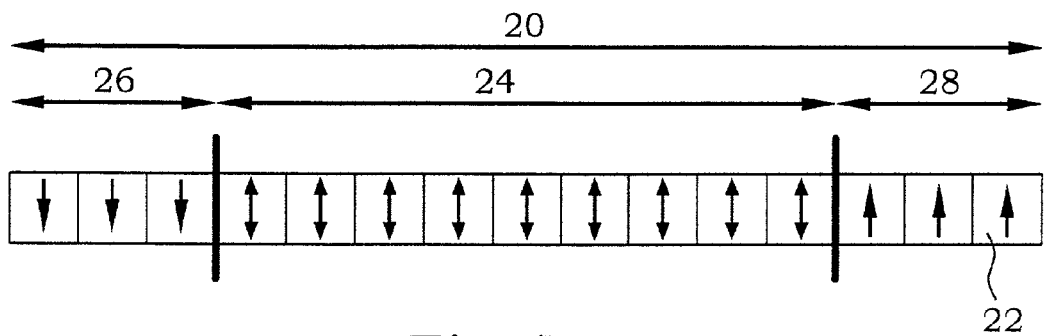
FIG. 7a is an embodiment of a region division according to the present invention.
Figure 7B:
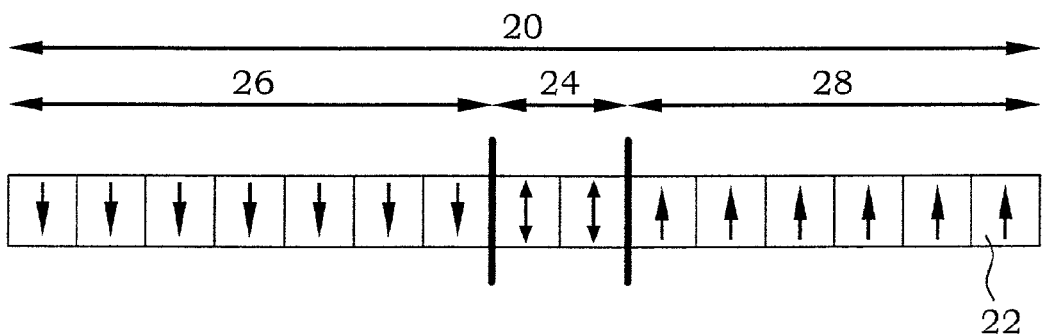
FIG. 7b is another embodiment of a region division according to the present invention.

In FIG. 7a, an example of a frame according to the present invention is illustrated. In this example, the hybrid region is large, and the dedicated regions are small. This example is probably beneficial for a situation, where the traffic situation differs a lot between different cells. The flexibility and dynamics have to be large, which is provided by the large hybrid region. In FIG. 7b, another example is illustrated. Here, the traffic situation in the different cells is less varying, but instead the total mean capacity demand is high. A small hybrid region is in such a case preferred, which results in a low loss in capacity due to the higher reuse.

Figure 7C:
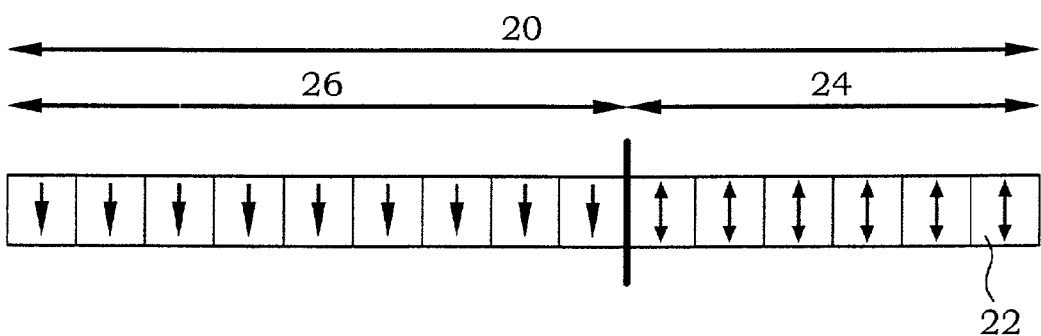
FIG. 7c is yet another embodiment of a region division according to the present invention.

More extreme cases may also occur. FIG. 7c illustrates a system, where there is a high demand for downlink resources, but not for uplink resources. Some uplink communication takes place, but the hybrid region can handle this limited amount of uplink traffic. In such a case, a division into only two regions may be beneficial, one dedicated downlink region and one hybrid region.

Above, it was pointed out that a change in the region extensions and/or reuse patterns has to be performed system-wide in a coordinated manner. In contrary, the allocation of the communication resources in the hybrid region available to the cell may instead advantageously be performed locally for each individual cell. Since the possible interference is reduced by means of the increased reuse in the hybrid region, the allocation can be made more or less independent from each other. It is therefore of interest to monitor the local traffic situation in each cell, in order to be able to select an allocation, which is as efficient as possible. The intra-cell adaptation of the allocation pattern within the hybrid region thus normally occurs much more frequent than the adaptations of the hybrid region itself. If the present traffic situation changes, including also quite rapid changes, the allocation can readily be adapted accordingly, within the limitations set by the system-wide definition of reuse and hybrid region borders. It is possible for the cell to adapt its, to the dedicated regions adjacent, hybrid communication resources for either uplink or downlink traffic to reduce the interference.

Figure 8:
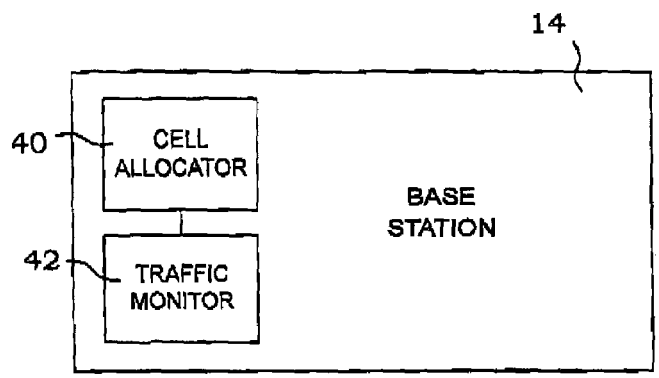
FIG. 8 is a block diagram of an embodiment of a base station according to the present invention.

FIG. 8 illustrates a block scheme of a base station 14 according to an embodiment of the present invention. Only units of interest for the present invention are discussed and the FIG. 8 should thus not be considered as a complete block scheme of a base station. The base station 14 comprises a cell allocator 40, which is a means for changing allocation of communication resources of the hybrid region between uplink and downlink traffic. This is performed independently of other base stations in the system. The base station 14 preferably also comprises a traffic monitor 42, which is a means for monitoring the local cell traffic situation. The results from the monitoring are provided to the cell allocator 40, for constituting a base for a decision of a possible allocation change.

Figure 9:
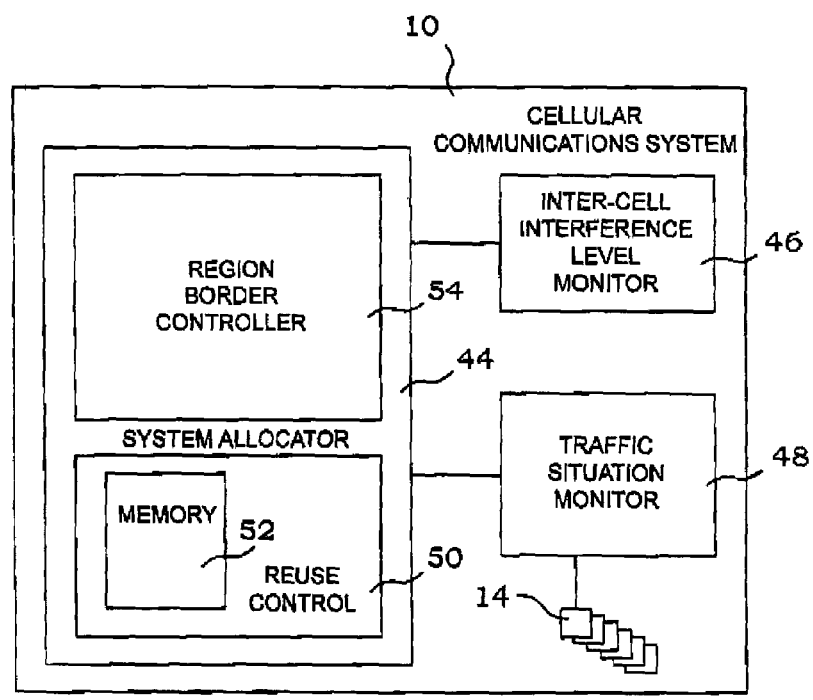
FIG. 9 is a block diagram of an embodiment of a cellular communication system according to the present invention.

FIG. 9 illustrates a block scheme of a cellular communication system 10 according to an embodiment of the present invention. Only units of interest for the present invention are discussed and FIG. 9 should thus not be considered as a complete block scheme of a cellular communication system. The cellular communication system 10 comprises a system allocator 44, which is responsible for system-wide allocation of communication resources. The system allocator 44 comprises a reuse control means 50, which controls the reuse patterns of the different regions of the system, in particular the reuse pattern of the hybrid region. Preferably, the reuse control means 50 comprises memory means 52 with stored pre-planned reuse patterns. The system allocator 44 also comprises a region border controller 54, which controls the position of the borders between the different regions.

The cellular communication system 10 also preferably comprises means for obtaining or monitoring inter-cell interference level 46, e.g. means for obtaining propagation condition information. This may be a memory means having constant propagation conditions stored therein, or may be means for obtaining intermittent updates of such propagation conditions or other conditions important for the inter-cell interference level. A traffic situation monitoring means 48 obtains frequently updated information about the present traffic situation allover the system. In this embodiment, the traffic situation monitoring means 48 is connected to the different base stations, which each one intermittently reports the local traffic situation.

The system allocator 44, the inter-cell interference level monitor 46 and/or the traffic situation monitoring means 48 are preferably included in a radio network controller and/or radio network internal/external operation and maintenance unit.

In the above embodiments, the communication resources have mainly been time slots, i.e. resources in the time domain. However, the communication resources could also be resources of the frequency domain, i.e. frequency bands or frequency slots, of the code domain, i.e. spreading codes or combinations of time slots, frequency bands, and/or codes.

In the illustrated embodiments, the regions in the frames consist of one single section of communication resources. However, the regions can be defined in any configuration and can e.g. comprise sections of or single communication resources spread over the entire frame.

The present invention offers a solution to handle asymmetric traffic in a cellular communication system. By means of the proposed solution, any region or cell of the cellular system can fast and locally adapt the resource allocation to the current traffic demand.

It will be understood by those skilled in the art that various modifications and changes may be made to the present invention without departure from the scope thereof, which is defined by the appended claims.

What is claimed is:

1. A cellular communication system using frames of communication resources in time and/or frequency domain in communication to and from mobile units, wherein:

said communication resources within each of said frames are divided into at least three regions, whereby a first region has a higher reuse than a second and a third region;

said first region being a hybrid region, in which the communication resources individually are allocable for either uplink or downlink communication on a cell-to-cell basis, whereby a communication resource of said first region is allocable for uplink communication in one cell of said cellular communications system simultaneously as the same communication resource is allocable for downlink communication in another cell of said cellular communications system;

said second region being a dedicated region, in which all communication resources are system-wide dedicated to downlink communication; and said third region being a dedicated region, in which all communication resources are system-wide dedicated to uplink communication.

2. A system according to claim 1, wherein at least one base station of said cellular communication system comprises:

means for changing allocation of the communication resources of said first region, which according to the reuse of said first region is available for said base station, independently of other base stations.

3. A system according to claim 2, wherein said at least one base station further comprises:

means for monitoring a local cell traffic situation, connected to said means for changing allocation.

4. A system according to claim 1, further comprising:

means for system-wide changing the division of said regions.

5. A system according to claim 1, further comprising:

means for system-wide changing said reuse of said first region.

6. A system according to claim 5, wherein said means for system-wide changing said reuse of said first region in turn comprises memory means for predetermined reuse patterns.

7. A system according to any of the claim 4, further comprising:

means for obtaining interference levels between cells and/or for monitoring a present traffic situation, connected to said means for system-wide changing said reuse of said first region and/or said means for system-wide changing the division of said regions.

8. A system according to claim 1, wherein said reuse is provided in at least a time domain.

9. A system according to claim 1, wherein said reuse is provided in at least a frequency domain.

10. A system according to claim 1, wherein said reuse is provided in at least a code domain.

11. A base station for use in a cellular communication system using frames of communication resources in time and/or frequency domain, wherein said communication resources within each of said frames are divided into at least three regions, whereby a first region has a higher reuse than a second and a third region;

said first region being a hybrid region, in which the communication resources individually are allocable for either uplink or downlink communication on a cell-to-cell basis, whereby a communication resource of said first region is allocable for uplink communication in one cell of said cellular communications system simultaneously as the same communication resource is allocable for downlink communication in another cell of said cellular communications system;

said second region being a dedicated region, in which all communication resources are system-wide dedicated to downlink communication; and said third region being a dedicated region, in which all communication resources are system-wide dedicated to uplink communication.

12. A base station according to claim 11, further comprising:

means for changing allocation of the communication resources of said first region, which according to the reuse of said first region is available for said base station, independently of other base stations in said cellular communication system.

13. A base station according to claim 12, further comprising:

means for monitoring a local cell traffic situation, connected to said means for changing allocation.

14. A base station according to claim 11, wherein said reuse is provided in at least a time domain.

15. A base station according to claim 11, wherein said reuse is provided in at least a frequency domain.

16. A base station according to claim 11, wherein said reuse is provided in at least a code domain.

17. A communication method in a cellular communication system using frames of communication resources in time and/or frequency domain, comprising the steps of:

using a higher slot reuse for communication resources within a first region of each of said frames than for the communication resources within a second region and a third region of each of said frames;

allocating the communication resources in said first region, which according to the reuse of said first region is available for each base station, individually for either uplink or downlink communication on a cell-to-cell basis, whereby a communication resource said first region is allocable for uplink communication in one cell of said cellular communications system simultaneously as the same communication resource is allocable for downlink communication in another cell of said cellular communications system;

allocating all of the communication resources in said second region system-wide for uplink communication; and allocating all of the communication resources in said third region system-wide for downlink communication.

18. A communication method according to claim 17, comprising the further step of:

monitoring a local cell traffic situation, whereby said step of allocating the communication resources in said first region is based on said monitored cell traffic situation.

19. A communication method according to claim 17, comprising the further step of:

adapting said regions system-wide.

20. A communication method according to claim 19, comprising the further step of:

obtaining information about interference levels between cells, whereby said step of adapting said regions is based on said information.

21. A communication method according to claim 19, comprising the further step of:

monitoring a present system traffic situation, whereby said step of adapting said regions is based on said system traffic situation.

22. A communication method according to claim 17, comprising the further step of:

adapting said reuse of said first region system-wide according to a predetermined reuse pattern.

23. A communication method according to claim 22, comprising the further step of:

obtaining information about propagation conditions between cells, whereby said predetermined reuse pattern is selected based on said information.

24. A communication method according to claim 22, comprising the further step of:

monitoring a present system traffic situation, whereby said predetermined reuse pattern is selected based on said system traffic situation.

25. A communication method according to claim 17, comprising the further step of providing said reuse in at least a time domain.

26. A communication method according to claim 17, comprising the further step of providing said reuse in at least a frequency domain.

27. A communication method according to claim 17, comprising the further step of providing said reuse in at least a code domain.

* * * * *